INVENTOR.
WILLIAM A. OLSEN
BY
ATTORNEYS

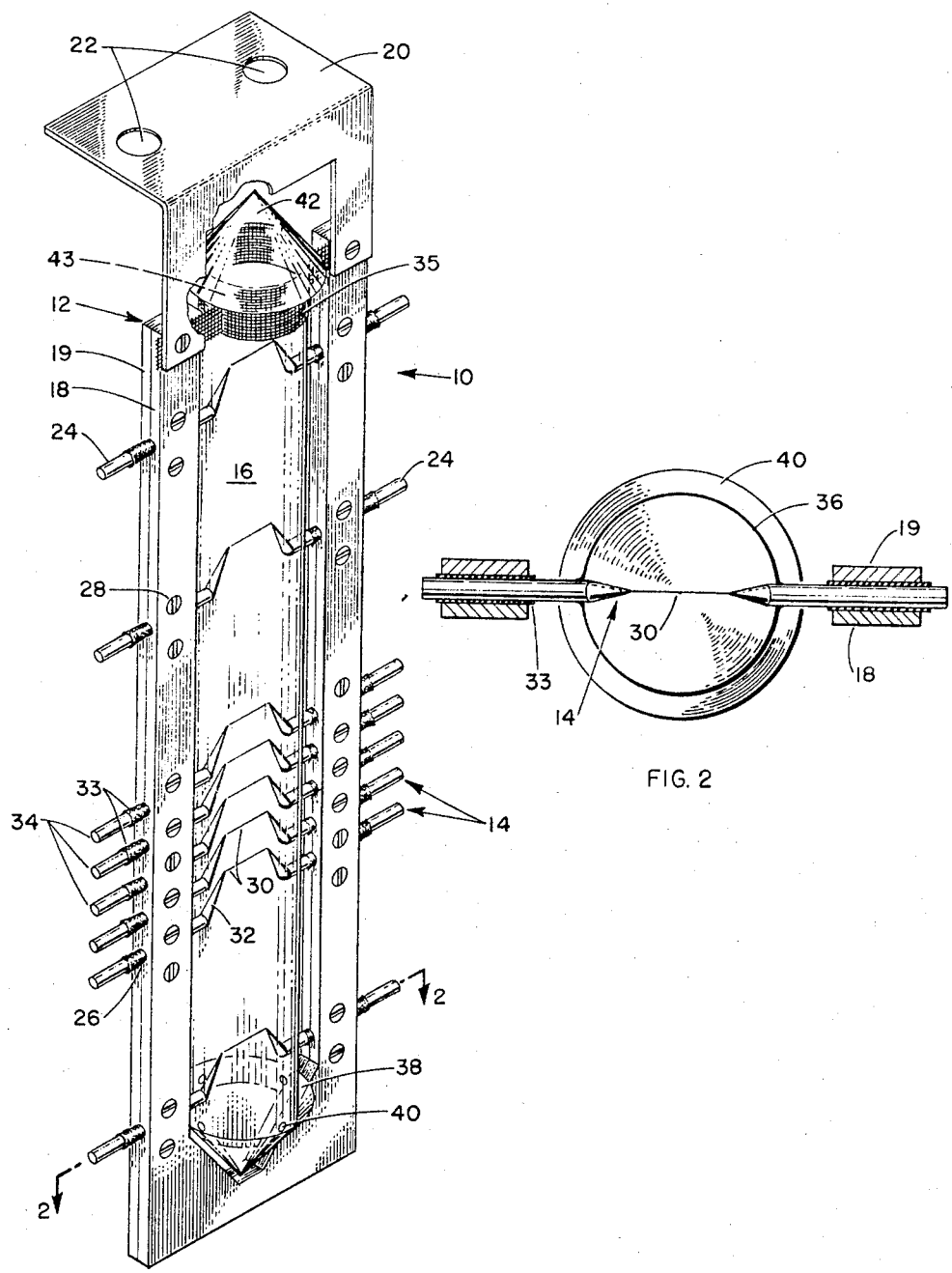

Sept. 20, 1966  W. A. OLSEN  3,273,392
HOT WIRE LIQUID LEVEL DETECTOR FOR CRYOGENIC FLUIDS
Filed July 17, 1963  3 Sheets-Sheet 3

INVENTOR.
WILLIAM A. OLSEN
BY
ATTORNEYS

United States Patent Office 3,273,392
Patented Sept. 20, 1966

3,273,392
HOT WIRE LIQUID LEVEL DETECTOR FOR CRYOGENIC FLUIDS
William A. Olsen, Lakewood, Ohio, assignor to the United States of America as represented by the Administrator of the National Aeronautics and Space Administration
Filed July 17, 1963, Ser. No. 295,855
10 Claims. (Cl. 73—295)

The invention described herein may be manufactured by or for the Government of the United States of America for governmental purposes without the payment of any royalties thereon or therefor.

The present invention relates, generally, to liquid level detectors, and more particularly, to a hot wire detector for cryogenic fluids.

The upper stages of vehicles utilizing advanced chemical rockets for interplanetary and lunar flight missions as well as nuclear rockets therefor, may utilize liquid hydrogen as a propellant. These vehicles will require liquid level gauging of the hydrogen propellant for proper and efficient utilization of this fluid. Although various techniques and methods for gauging the liquid level of tanks have been successfully employed for conventional propellants, including oxygen, new gauging problems arise when liquid hydrogen is utilized as the propellant since the low boiling temperature and low density of hydrogen markedly influence the performance of commonly-used sensors or gauges.

Total content sensors are subject to a major source of error introduced by the indication of both the mass of liquid and the mass of gas above it. Point sensors which utilize the large property difference (e.g., the difference in densities) across the interface of the liquid and gas are subject to errors due to the discontinuities of the fluid at the point of sampling. Because of the large error inherent in total content sensing, generally, during filling, holding and outflow, the level of the propellant in a tank has been measured by point sensors. However, because of the aforementioned properties of hydrogen, these sensors suffer from inaccuracies such as liquid interface disturbances, liquid adherance to the sensors, sensor time lag, splashing and dripping of liquid onto the sensors, and slow sensor cool-down time. For example, sonar level sensors are inoperative in liquid hydrogen because of the high dispersion of sound energy at the interface due to disturbances such as boiling, bubbling and the like, while ultrasonic switches are unable to accurately locate the liquid level since frothing and other interfacial disturbances tend to damp out resonance prior to actual liquid contact.

Although hot wire liquid level detectors are well known, prior art devices, when used to determine the level of liquid hydrogen, have either suffered from switching time lags due to the extensive mass of the hot wire or, alternatively, if wires of small mass were utilized, have improperly indicated a change in phase due to the impingement of liquid droplets and bubbles on the hot wire. These interfacial disturbances have previously been successfully suppressed by the use of stillwells, however, unless the liquid level detector is properly designed, their use in hydrogen introduces new problems that may be equally as serious as those already enumerated.

Accordingly, an object of the present invention is to provide a liquid level sensor with rapid response which is physically isolated from shocks or loads imposed on its supporting structure.

It is another object of this invention to provide a liquid level sensor which is isolated from interfacial disturbances during filling, holding, and outflow.

Still another object of the invention is to provide a liquid level sensor which is isolated from its supporting structure and any interfacial disturbances caused by it such as boiling or splashing of the liquid.

It is yet another object of the invention to provide a liquid level detector wherein the monitored liquid is free of bubbles. Therefore, the density of the monitored liquid is not affected by bubbles so that a liquid level location leads directly to a liquid mass indication.

A more complete appreciation of the invention and many attendant advantages thereof will be readily appreciated as the same becomes better understood by reference to the following detailed description when considered in connection with the accompanying drawings wherein:

FIG. 1 is a perspective view of one embodiment of the invention.

FIG. 2 is a sectional view taken substantially on line 2—2 of FIG. 1 and illustrates one of the sensor assemblies.

Figure 4:
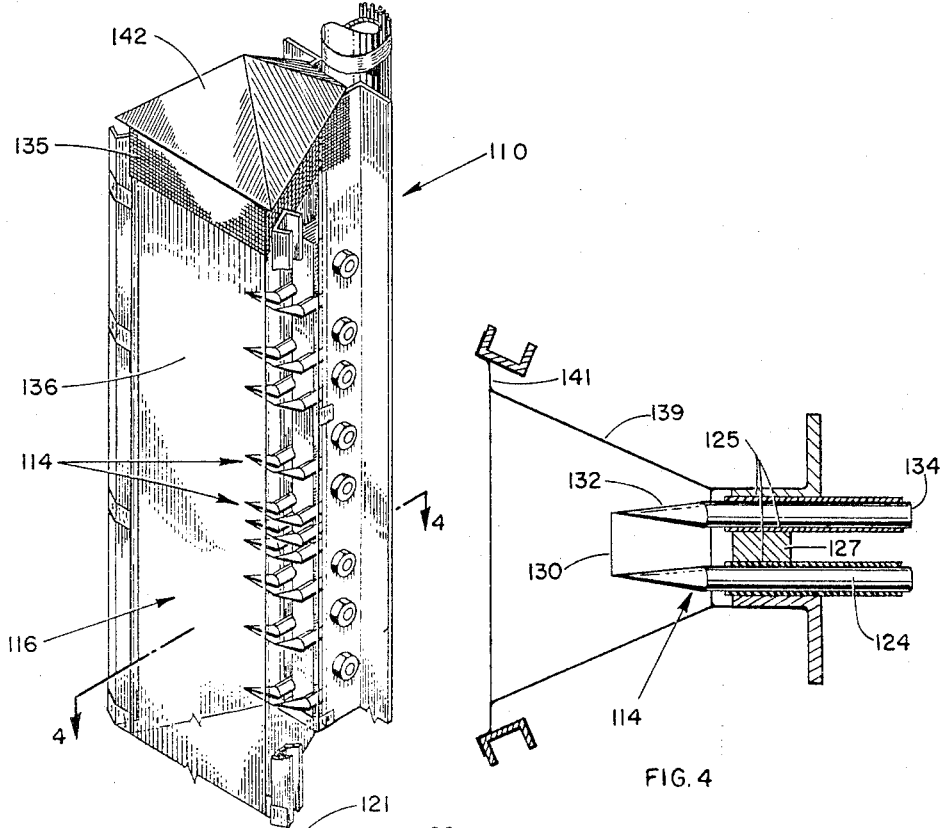
FIG. 4 is a sectional view taken substantially on line 4—4 of FIG. 3 and illustrates one of the sensor assemblies.

According to the present invention, the foregoing and other objects are obtained by providing a novel liquid level detector in which sensors are mounted in a rigid supporting structure and are isolated from substantially all liquid interface disturbances, including those disturbances generated by the mass of the gauge supporting structure, by enclosure in a stillwell. Resistance or "hot" wires of very small diameter and high resistance are utilized as the sensors to provide fast response and are suspended from upwardly directed rigid spikes attached to the supporting structure to thereby provide for rapid liquid drainage and physical isolation from loads or shocks imposed upon this structure. The stillwell is comprised of a material having a low heat capacitance for quick cool-down, while, the bottom of the stillwell is provided with open ports for the admittance of liquid propellant and a bubble deflector to prevent bubble ingress to the stillwell interior.

Referring now to the drawings, there is shown in FIG. 1 a liquid level detector, indicated by the numeral 10, provided with a supporting structure 12 from which a series of sensor assemblies 14 and a stillwell 16 are mounted. The supporting structure 12 comprises a pair of rigid generally U-shaped frame members 18 and 19 which are fastened in face-to-face relationship in depending fashion from angle iron 20, by screws or the like. The supporting structure may be affixed to any convenient means provided on the propellant tank through attachment holes 22 in angle iron 20.

Each of the sensor assemblies 14 comprises a hot wire 30, serving as a sensor element, and comprising, for example, a material containing 72% nickel and 28% iron, and a pair of opposed supporting probes or spikes 24. As best seen in FIG. 2, the supporting probes 24 are clamped between the U-shaped frame members 18 and 19 by being mounted in holes 26 formed intermediate of the frame members and are releasingly held therebetween by screws 28 which join the frame members. The probes 24 of each pair extend inwardly into the bight of the opposed U-shaped frame members and losely suspend therebetween the resistance or hot wire 30, with the connecting means for the hot wire being formed by soldering or the like to upwardly-turned and tapered ends 32 of the probes which furnish rapid and easy drainage of liquid propellant from the hot wire. Additionally, the spikes 24 extend outwardly through the supporting structure 12, being insulated therefrom by rings 33, and terminate in solder lugs 34 to which connection of the requisite electric circuitry (not shown) is made.

The sensor assemblies 14 are isolated from interfacial disturbances of the main body of fluid, including any disturbance attributable to the liquid level supporting structure, by stillwell 16 suspendingly mounted within the bight of the U-shaped frame members 18 and 19 by a metal screen vent 35 which is clampingly held between the angle iron 20 and U-shaped supporting member 18. The vent 35, being formed from a screen of relatively fine mesh, serves as a barrier to liquid droplets which impinge on the stillwell, yet is still operable as a pressure relieving vent as liquid propellent rises and falls in the stillwell. Attached to the screen vent 35 in depending fashion by an epoxy cement or the like, is the well-forming cylindrical tube 36 formed from low heat capacitance material and closed at its lower end by a conical bubble shield 38 of similar material, sealingly attached thereto also by an epoxy cement or the like. Although any material with a low heat capacitance and flexibility at cryogenic conditions would be suitable for this application, in practice it has been found that a polyester film material such as that sold under the trade name, "Mylar" is very satisfactory for this purpose and, furthermore provides the advantages of transparency for visual observation and easy fabrication of the stillwell.

As best seen in FIG. 1, the bubble shields 38 is extended in an overlapping relationship with the lower portion of the cylindrical tube 36 to prevent the entry of bubbles of gaseous propellant into the stillwell through liquid entry holes or perforations 40. Additionally, the upper end of the stillwell is closed by conical roof 42 which has an engaging portion 43 for sliding insertion within the confines of screen vent 35.

The stillwell 16, although already suspended within the supporting structure 12 by the screen vent 35, is additionally spaced from the sidewalls and of the U-shaped frame members 18 and 19, and braced against side sway by the supporting probes 24 which pierce the envelope of the cylindrical shell and are sealingly held thereto by means of an epoxy cement or the like.

The operation of the invention is as follows: As the level of liquid rises in the tank, a corresponding rise occurs in the stillwell 16 and a hot wire 30 is immersed. Because of the increased rate of heat transfer to the liquid, the temperature of the hot wire decreases and, accordingly, its resistance. This resistance may be made the leg of a resistance bridge (not shown), balanced when the hot wire is immersed, whose potential is amplified to actuate any conventional electric means such as a relay (not shown), which may then turn an indicating light (not shown) on or off.

Figure 3:
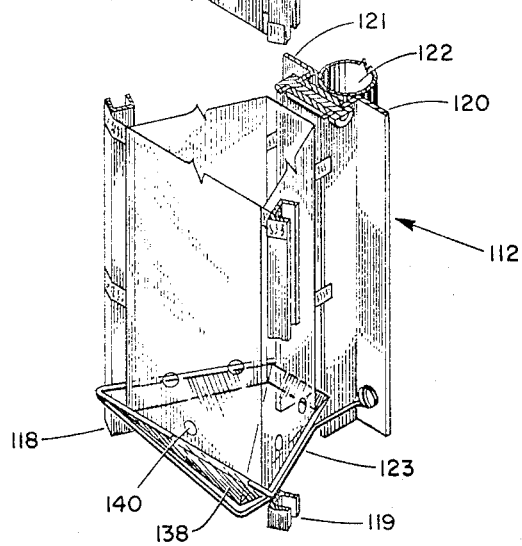
FIG. 3 is a perspective view of a second embodiment of the invention.

Referring now to a second embodiment of the invention as shown in FIGS. 3 and 4 wherein, there is disclosed a liquid level detector of heavier construction than the first embodiment and thus, effectively able to provide for a greater number of sensor locations. The detector, indicated generally at 110, is provided with a supporting structure 112 from which a series of sensor assemblies 114 and a stillwell 116 are mounted. The supporting structure 112 is generally trapezoidal in cross section with one parallel side being formed by a pair of upstanding channel members 118 and 119 and the other parallel side being formed by a pair of closely-spaced upstanding angle members 120 and 121 clampingly encompassing a pipe 122 which is connected to any convenient means on the propellant tank. The channel members 118 and 119 and angle members 120 and 121 are held in spaced relationship at the top by a roof 142, joined thereto by spot welding or the like, and at the bottom by a bent clamping rod 123 which is fixed to the channel members 118 and 119 in a similar manner, while being boltingly attached to the angle members 120 and 121.

Disposed between and clampingly held by angle members 120 and 121 are sensor assemblies 114 (best seen in FIG. 4), each sensor assembly including a pair of parallel supporting spikes of probes 124 insulated from the supporting structure by insulating blocks 125 and 127. The probes 124 extend inwardly and outwardly of the supporting structure and terminate, respectively, in upwardly directed and tapered ends 132 which suspendingly hold resistance or hot wire 130 and solderings 134 to which connection of electric circuitry (not shown) is made.

Stillwell 116 is mounted intermediate the channel and angle members 118-121 and comprises a "Mylar" tube 136 suspendingly held by screen vent 135 which, in turn, is fixedly attached to roof 142, substantially prismatic in shape, by spot welding or brazing. Tube 136, similarly to the supporting structure, is also substantially trapezoidal in cross section and is formed of two "Mylar" sheets 137, 139 which are joined by epoxy cement or the like and spatially held between the channel and angle members of the supporting structure by "Mylar" tabs 141. The bottom portion of the stillwell 116 is closed by a prismatic bubble shield 138 which is sealingly held thereto by an epoxy cement or the like and extends in a slightly overlapping relationship with the lower portion of the tube to prevent bubble egress through liquid entry holes or perforations 140.

As with the first embodiment, probes 124 pierce the envelope of the stillwell 116 which is sealingly assured against leaks thereby, by an epoxy cement or the like.

Figures 5, 6:
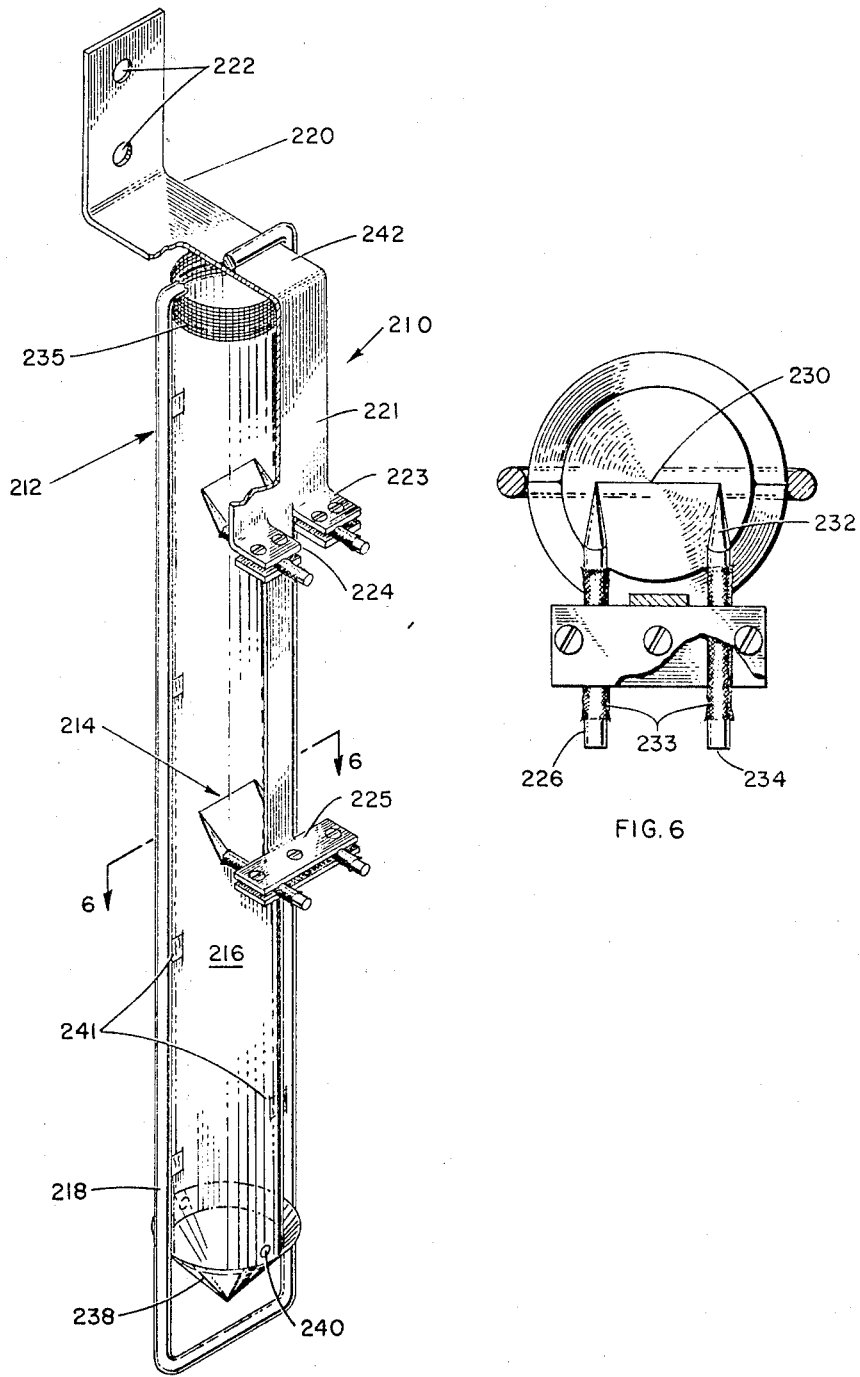
FIG. 5 is a perspective view of still another embodiment of the invention.
FIG. 6 is a sectional view taken substantially on line 6—6 of FIG. 5 and illustrates one of the sensor assemblies.

A third embodiment of the invention, illustrated in FIGS. 5 and 6 may be utilized when only a limited number of sensor locations are required. It comprises a liquid level detector 210 which includes a supporting structure 212 from which a series of sensor assemblies 214 and a stillwell 216 are mounted. The supporting structure 212 is comprised of a heavy wire rod 218 bent in a generally rectangular shape and attached by welding or brazing to a bent strap 220 provided with tank attaching holes 222. The bent strap 220 includes a depending portion 221 which, advantageously, is split to provide attaching ears 223, 224, and 225, to which the sensor assemblies are attached by clamping blocks or the like.

Each of the sensor assemblies 214 comprise a pair of hot wire supporting probes or spikes 226 provided with upturned tapered ends 232, between which hot wire 230 is suspended, and solder lugs 234 to which the electrical circuitry (not shown) is connected. The spikes 226 are insulated from the supporting structure by cylindrical rings 233, and as with the previously described embodiments of the invention, the probes pierce the envelope at the stillwell 216, with the "Mylar" cylindrical shell 230 of the stillwell sealingly held thereto by epoxy cement or the like. The lower portion of the stillwell is also provided with a conical bubble shield 238, sealingly attached thereto and extending slightly above the perforations 240 to prevent egress of bubbles to the interior of the stillwell 216. The stillwell is held in spatial displacement from the sides of the supporting structure by "Mylar" tabs 241 and is suspended from vent screen 235 in depending fashion by epoxy cement or the like. A roof for the stillwell is provided by horizontal portions 242 of the bent strap with the screen 235 attached thereto by spot welding or the like.

In practice it has been found that the invention provides a liquid level detector of very great durability, and yet a detector which is not subject to the inaccuracies of prior art devices when subjected to the low boiling temperatures and low densities of liquid hydrogen. A very thin resistance wire (e.g. .001 inch diameter) may be utilized to provide rapid response since the wire is not subject to the loads and shocks imposed on the detector supporting structure. Additionally, the walls of the stillwell need only be .001 inch thick to provide an adequate stillwell thus significantly reducing the mass of the low heat capacitance material and any interface disturbances attributable to it.

Certain embodiments of the invention have been shown and particularly described for the purposes of explaining the principal of operation of the invention and showing its application, but it will be obvious to those skilled in the art that many modifications and variations are possible, and it is intended, therefore, to cover all such modifications and variations as fully within the scope of the invention.

What is claimed:

1. A liquid level sensor to be utilized for measuring the level of cryogenic fluids including a supporting structure; at least a pair of electrically-conductive probes supported on said structure, resistance wires spanning the probes and in electrical connection therewith, and a stillwell comprising a thin shell of low heat capacitance material disposed within the supporting structure and surrounding said probes for isolating the said probes from the structure.

2. A hot wire liquid level sensor comprising an open supporting structure; at least a pair of electrically conductive contacts clampingly supported on said structure; resistance wires spanning the contacts and in electrical connection therewith; a stillwell of a resilient, polyester film material disposed within the supporting framework and suspended therefrom; said contacts piercing the film material of the stillwell and being sealingly attached thereto; said stillwell serving to isolate the resistance wire from the supporting structure.

3. A liquid level detector to be utilized for measuring the level of cryogenic fluids including an open supporting structure; a plurality of pairs of electrically conductive probes clampingly supported by said structure; a resistance wire electrically connected to and loosely suspended between each paired probes; insulating means disposed between the probes and supporting structure to electrically isolate the probes from the supporting structure, and a polyester film material forming a stillwell disposed within the supporting structure and depending therefrom, said probes piercing the stillwell and being sealingly attached thereto.

4. A liquid level sensor for detecting the level of a cryogenic fluid comprising a substantially open framework; at least a pair of electrically-conductive probes clampingly held by the framework; resistance wires spanning the probes and in electrical connection therewith; and a stillwell disposed within the framework and suspended in depending relation thereto; said stillwell comprising a thin walled vessel formed from low heat capacitance material and including a bottom, said bottom being disposed in overlapping relation to the vessel to thereby provide a barrier to the egress of bubbles into the vessel.

5. A hot wire liquid level sensor comprising a substantially open supporting structure; at least a pair of electrically conductive contacts clampingly supported on said structure; resistance wires spanning the contacts and in electrical connection therewith; a stillwell formed from a polyester film material of low heat capacitance; said still well being provided with a vent screen at its upper end for suspendingly supporting the stillwell within the supporting structure; said stillwell having liquid entrance holes contiguous to its lower end, and a bubble shield sealingly closing the lower end of the stillwell and overlapping the liquid entrance holes to thereby prevent the entrance of bubbles.

6. A liquid level sensor for detecting the level of a cryogenic fluid comprising a supporting structure including an open, substantially rectangular framework; at least a pair of electrically-conductive probes mounted on said structure; insulating means disposed between the electrically-conductive probes and supporting structure; resistance wires spanning the probes and in electrical connection therewith; and a stillwell comprising a thin cylindrical shell of low heat capacitance material disposed between the said wires and supporting structure for isolating the wires from interfacial disturbance of the cryogenic fluid.

7. The structure, according to claim 6, wherein the material of the thin cylindrical shell is "Mylar."

8. A liquid level sensor for detecting the level of a cryogenic fluid comprising an open, substantially rectangular framework including a pair of U-shaped frame members disposed in contiguous relationship and depending from a tank attaching element; at least a pair of opposed, electrically-conductive probes clampingly held between the U-shaped frame members; resistance wires loosely spanning the probes and in electrical connection therewith; a cylindrical shaped stillwell formed from a polyester film material disposed within the rectangular framework; said probes piercing the stillwell and terminating inwardly in upturned and tapered ends to provide liquid drainage for the resistance wires; said stillwell provided with perforations at its lower end, and a conical shield to prevent entrance of bubbles through the perforations.

9. A liquid level sensor comprising a substantially open framework, trapezoidal in cross section, and including a pair of channel members forming one parallel side of the trapezoid and a pair of angle members forming the other parallel side; at least a pair of electrically-conductive probes clampingly held between the angle members and extending towards the channel members; resistance wires spanning the probes and in electrical connection therewith, a stillwell formed from a polyester film disposed within the open framework, said probes piercing the stillwell and terminating in upwardly turned liquid draining ends, said stillwell provided with liquid entrance holes and a bubble shield, substantially prismatic in shape, extending adjacent to the holes to prevent the entrance of bubbles.

10. A liquid level sensor for the detection of the level of cryogenic fluids comprising a substantially open framework including a rod member bent in a rectangular shape; at least a pair of parallel probes clampingly held by the framework, resistance wires loosely spanning the probes and in electrical connection therewith; a cylindrical shaped stillwell formed from a polyester film material disposed within the rectangular framework; said probes piercing the stillwell and terminating inwardly in upturned, tapered ends, said stillwell provided with perforations at its lower end and a conical shield to prevent entrance of bubbles through the perforations.

UNITED STATES PATENTS

References Cited by the Examiner 2,211,606  8/1960  Pratt _____ 73—295
3,068,459  12/1962  Kreisler _____ 340—244

FOREIGN PATENTS 513,427  10/1939  Great Britain.

LOUIS R. PRINCE, *Primary Examiner.*

S. CLEMENT SWISHER, *Assistant Examiner.*